United States Patent [19]
Poth

[11] Patent Number: 6,099,220
[45] Date of Patent: Aug. 8, 2000

[54] CART LOCK

[75] Inventor: David E. Poth, Loudonville, Ohio

[73] Assignee: Kinedyne Corporation, North Branch, N.J.

[21] Appl. No.: 09/311,383

[22] Filed: May 13, 1999

[51] Int. Cl.$^7$ .................................................. B60P 7/08
[52] U.S. Cl. .............................. 410/94; 410/66; 410/121; 410/153
[58] Field of Search .................................. 410/66, 94, 95, 410/121, 130, 153; 248/351; 224/42.33, 42.34, 42.35

[56] References Cited

U.S. PATENT DOCUMENTS

| | | | |
|---|---|---|---|
| 2,273,854 | 2/1942 | Fitch . | |
| 3,984,117 | 10/1976 | Bates et al. | 410/66 |
| 4,200,046 | 4/1980 | Koliba et al. | 410/94 |
| 4,217,831 | 8/1980 | Koliba et al. | 410/121 |
| 4,278,376 | 7/1981 | Hunter | 410/130 |
| 4,465,413 | 8/1984 | Petrén | 410/94 |
| 4,717,298 | 1/1988 | Bott | 410/129 |
| 4,854,791 | 8/1989 | Brown | 410/94 X |
| 4,955,771 | 9/1990 | Bott | 410/94 |
| 5,137,405 | 8/1992 | Klein | 410/94 |
| 5,167,479 | 12/1992 | Bott | 410/121 |
| 5,562,374 | 10/1996 | Plamper | 410/66 |

FOREIGN PATENT DOCUMENTS

| | | | |
|---|---|---|---|
| 88/08379 | 11/1988 | WIPO | 224/42.34 |

*Primary Examiner*—Stephen T. Gordon
*Attorney, Agent, or Firm*—Young & Basile, P.C.

[57] ABSTRACT

A cargo locking device for restraining wheeled carts in freight trailers, trucks or railway cars from rolling. An elongated frame is slidably positionable within elongated spaced tracks. An abutment plate is pivotally mounted on the frame between storage and operative positions, and a prop lock bar pivoted to the frame selectively maintains the abutment plate in its operative position to prevent cart movement. The abutment plate and lock bar are pivotal to the non-obtrusive storage position.

10 Claims, 6 Drawing Sheets

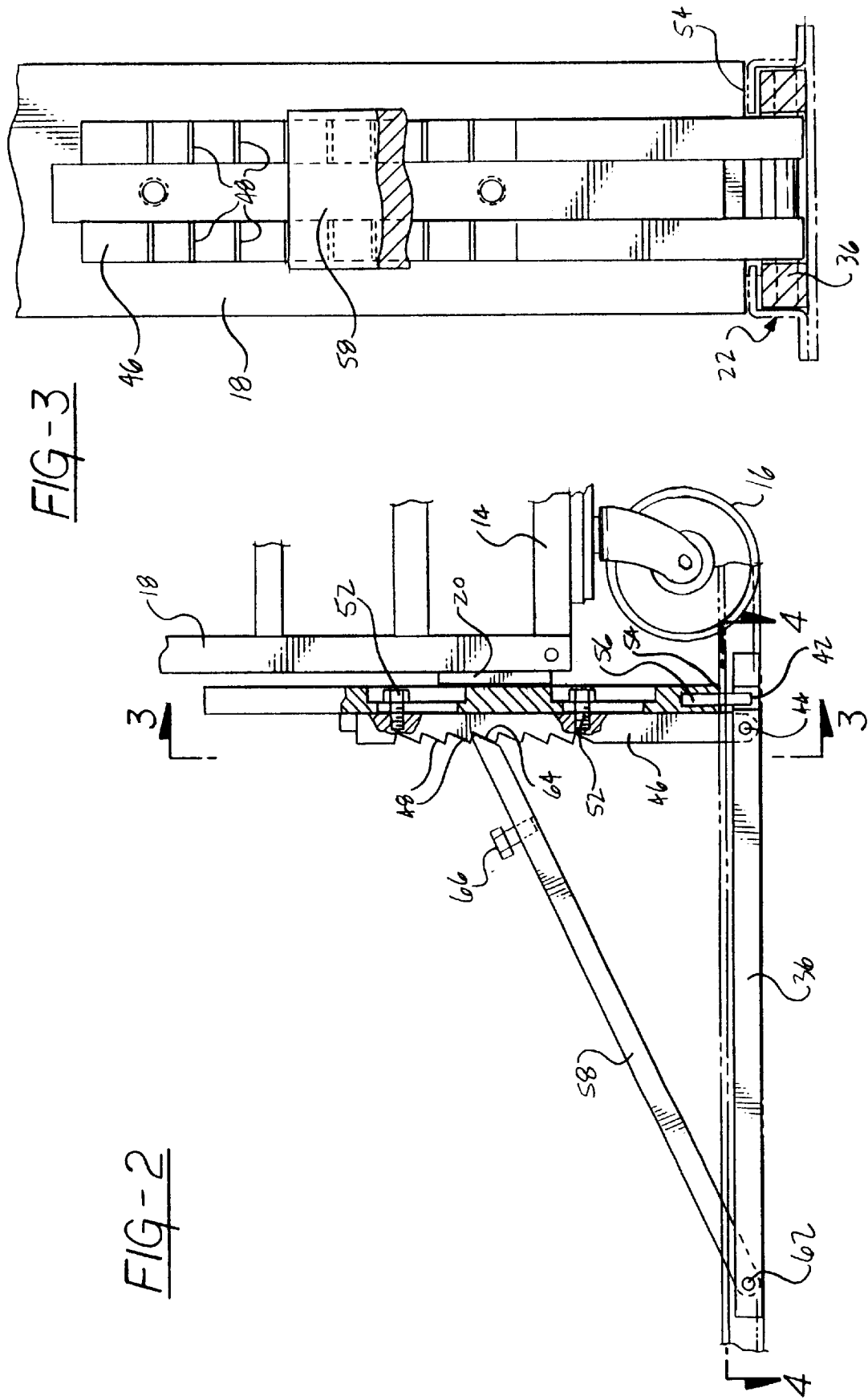

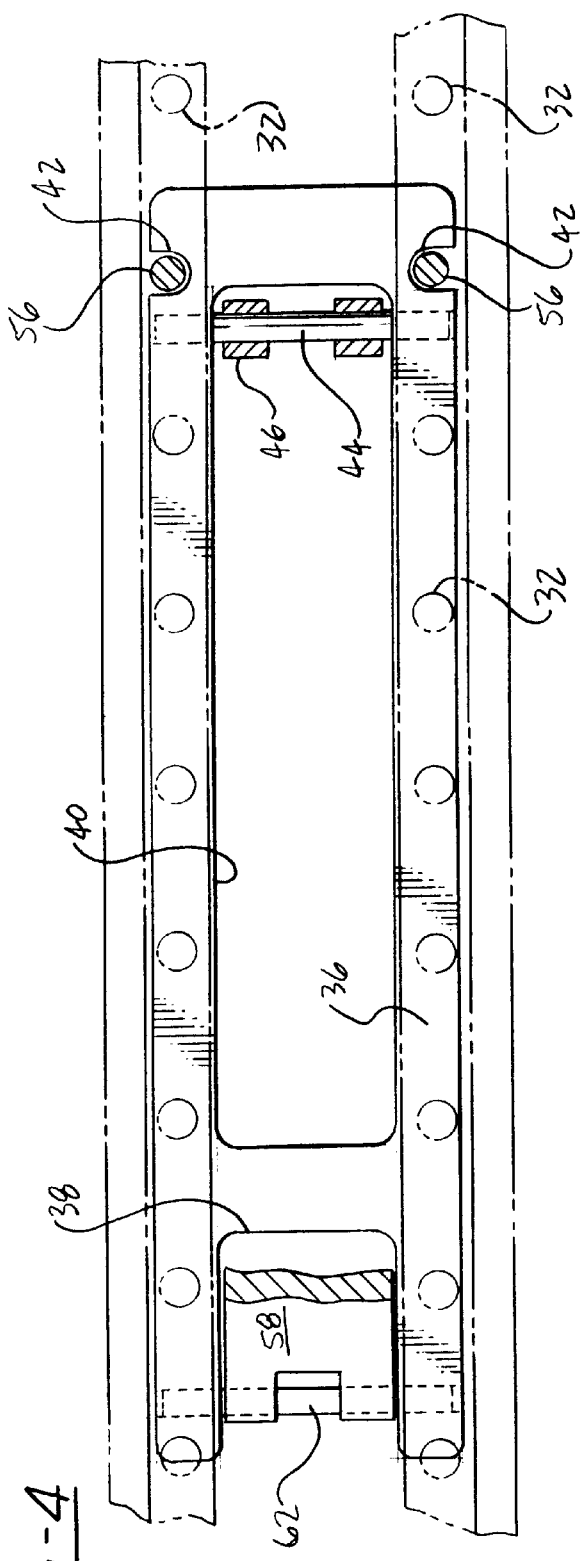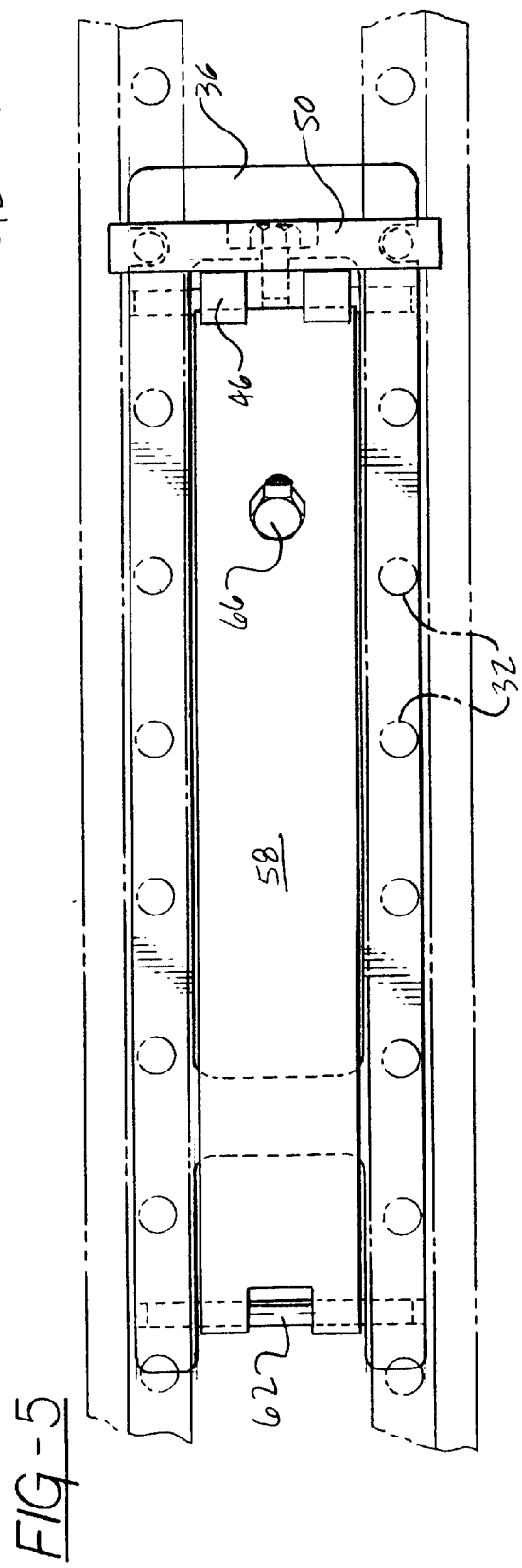

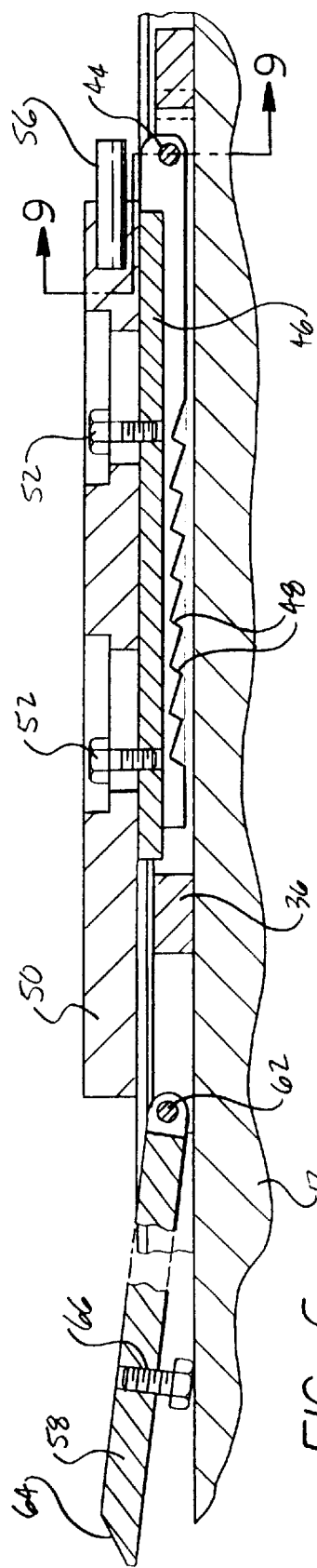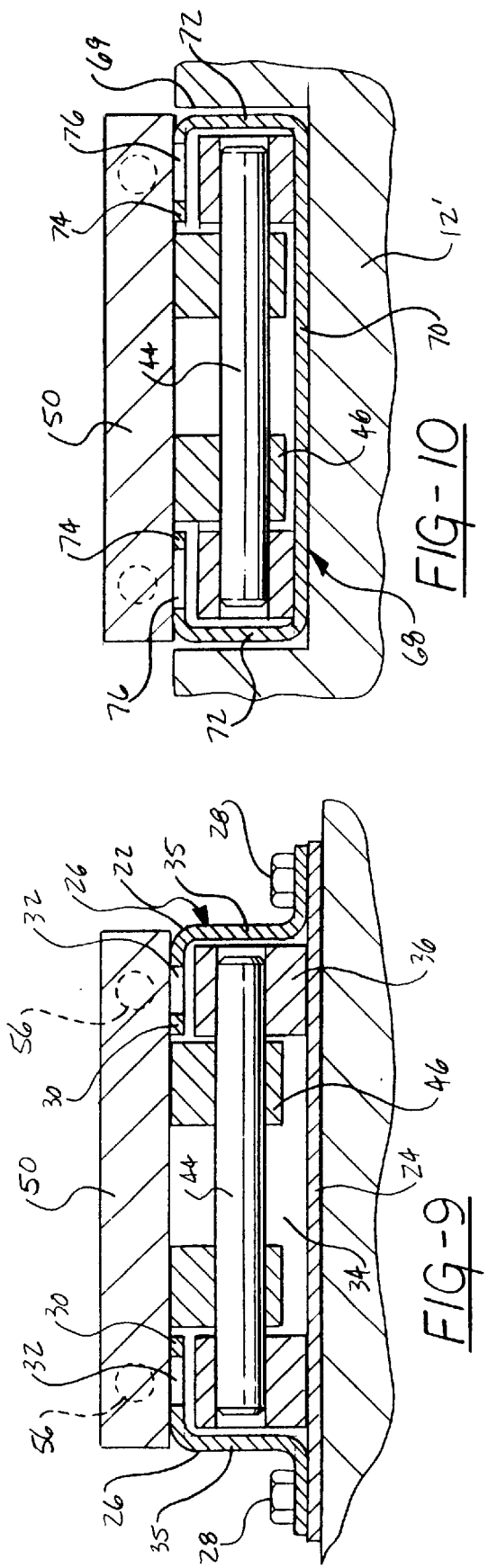

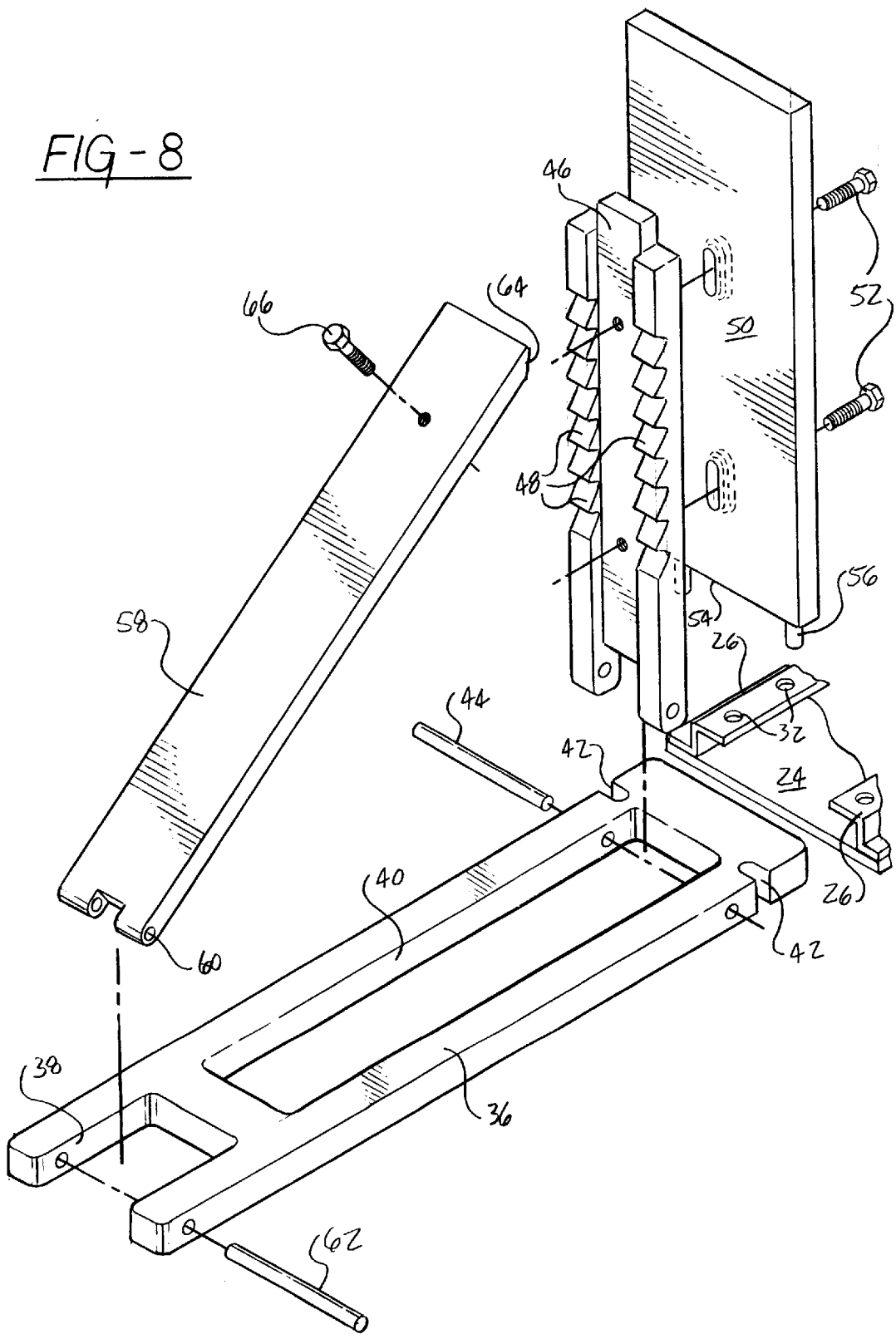

CART LOCK

BACKGROUND OF THE INVENTION

1. Field of the Invention

The invention pertains to cargo restraint or dunnage apparatus particularly suitable for restraining wheeled carts or hand trucks.

2. Description of the Related Art

Cargo restraints and dunnage equipment is used within railroad cars, truck trailers, truck beds, and the like, to restrain a load from shifting on the vehicle during travel, stopping and acceleration. Such devices may include straps, partition plates, abutments, and the like, and examples of such devices are shown in U.S. Pat. Nos. 4,278,376; 4,465,413; 4,717,298; 4,955,771; and 5,137,405. While devices such as those shown in the aforementioned patents restrain the movement of loads within vehicle cargo areas, such devices are not readily usable to restrain small wheeled carts or trucks located within the vehicle storage area upon which freight is carried.

It is common to use pallets for supporting cargo wherein the pallet may be placed upon the vehicle floor or deck, and the pallet and its load can be readily handled by a conventional lift truck. However, there is often a need to improve material handling situations by mounting the cargo upon small wheeled trucks or carts which are rolled into the vehicle cargo area and the cargo remains on the cart during transportation whereby the cart may be used to quickly remove the supported load from the vehicle without requiring a lift truck.

While the transporting of wheeled carts and small trucks may facilitate cargo handling, the fact that the trucks are on wheels requires that the trucks or carts be restrained against movement during shipping as the supporting vehicle accelerates, decelerates and turns. In the past, cart restraints usually consisted of tensioned webs anchored to the transporting vehicle, or dunnage bars extending across the vehicle cargo space, restrained cargo movement. Both of these types of restraint devices have disadvantages because of cost, difficulty of handling, and limitations of usage.

OBJECTS OF THE INVENTION

An object of the invention is to provide a locking or restraining device for wheeled cargo carts capable of effectively preventing cart movement within a cargo area, and which will automatically adjust itself to accommodate cart shifting.

Another object of the invention is to provide a lock for wheeled carts within a cargo area which is supported upon tracks, and wherein the components of the cart lock may be readily positioned to unobtrusive storage positions.

A further object of the invention is to provide a cart lock for wheeled carts in a cargo area wherein the lock may be readily adjusted with respect to permanently mounted tracks, and upon shifting the cart lock components from a stored position to an operative position, a high strength interconnection between the cart lock and permanently installed tracks is achieved.

SUMMARY OF THE INVENTION

The cart lock of the invention is located within the cargo space of a truck van, semi-trailer, railroad car, pick-up truck bed, or the like. The lock includes a pair of spaced parallel tracks which are affixed to the floor of the cargo space and may be either recessed into the floor, or surface mounted thereon. The tracks include a pair of horizontal spaced flanges defining a well therebetween and spaced circular holes are formed in the flanges in a transversely aligned manner.

An elongated frame is slidably positioned within the track well and maintained therein by the flanges in that the flanges overlap the frame. At the forward end of the frame, an abutment plate is pivotally mounted thereto through a rack. The abutment plate being affixed to the rack, and the width of the rack is such that it is receivable within the frame and between the track's well. The abutment plate and rack plate assembly is pivotal between an upright operative position wherein the abutment plate will engage a cart within the vehicle cargo area, and an inoperative lower position wherein the plate will be located within the track well and frame and will rest in a horizontal position upon the track flanges. The abutment plate lower edge constitutes a stop limiting pivoting of the abutment plate/rack plate assembly toward the load, and projections defined upon the lower edge of the abutment plate are received within the flange holes and notched openings defined in the frame when the abutment plate/rack plate assembly is pivoted to its upright operative position.

The abutment plate is maintained in its upright operative position by an elongated prop lock bar which is pivotally mounted upon the other or rear end of the frame at one end of the bar, and the other end of the bar engages selected ratchet teeth in the rack plate. In this manner, the lock bar supports the abutment plate in its operative upright position and is capable of preventing movement of the abutment plate away from the load.

A plurality of ratchet teeth are defined on the rack plate, and the weight of the lock bar permits the lock bar to automatically fall on the ratchet teeth to the next lower set of teeth if the engaged cart tends to move away from the abutment plate due to limited cart shifting. In this manner, the abutment plate and lock bar automatically "take up" any "play" that might have existed upon initial positioning of the abutment plate and associated frame.

The lock bar is pivotal to an inoperative storage position within the track well, and with the lock bar in the track well, and the abutment plate being located in its storage position upon the track flanges, the cart lock is unobtrusively located adjacent the tracks and vehicle support floor permitting the wheeled carts to readily pass thereover during loading or unloading procedures.

The construction of a cart lock in accord with the invention permits a high strength selectively positionable abutment plate to be located adjacent a wheeled cart to prevent shifting of the cart thereon. Operation and setup of the cart lock is simple and within the ability of non-skilled labor to operate. The construction permits high forces to be effectively resisted that may be imposed upon the abutment plate, and the ease of positioning of the cart lock in the track, and its low profile when in the storage position, provides an effective and efficient cart lock to be readily positioned as needed.

BRIEF DESCRIPTION OF THE DRAWINGS

The aforementioned objects and advantages of the invention will be appreciated from the following description and accompanying drawings wherein:

FIG. 2 is a partial side elevational view, partially broken, of the lock cart in operation engaging a wheeled cart, FIG. 3 is an elevational sectional view taken along Section 3—3 of FIG. 2, FIG. 4 is a plan sectional view as taken along Section 4—4 of FIG. 2, FIG. 5 is a plan elevational view of the cart lock in its operative position, FIG. 6 is an elevational sectional view of the cart lock components when in the stored position, FIG. 8 is an exploded perspective view of the cart lock, FIG. 9 is an elevational sectional view as taken along Section 9—9 of FIG. 6, and FIG. 10 is a view similar to FIG. 9 but wherein the track is built into the supporting floor, rather than the track being surface mounted as shown in FIGS. 1–9.

DESCRIPTION OF THE PREFERRED EMBODIMENT

Figure 1:
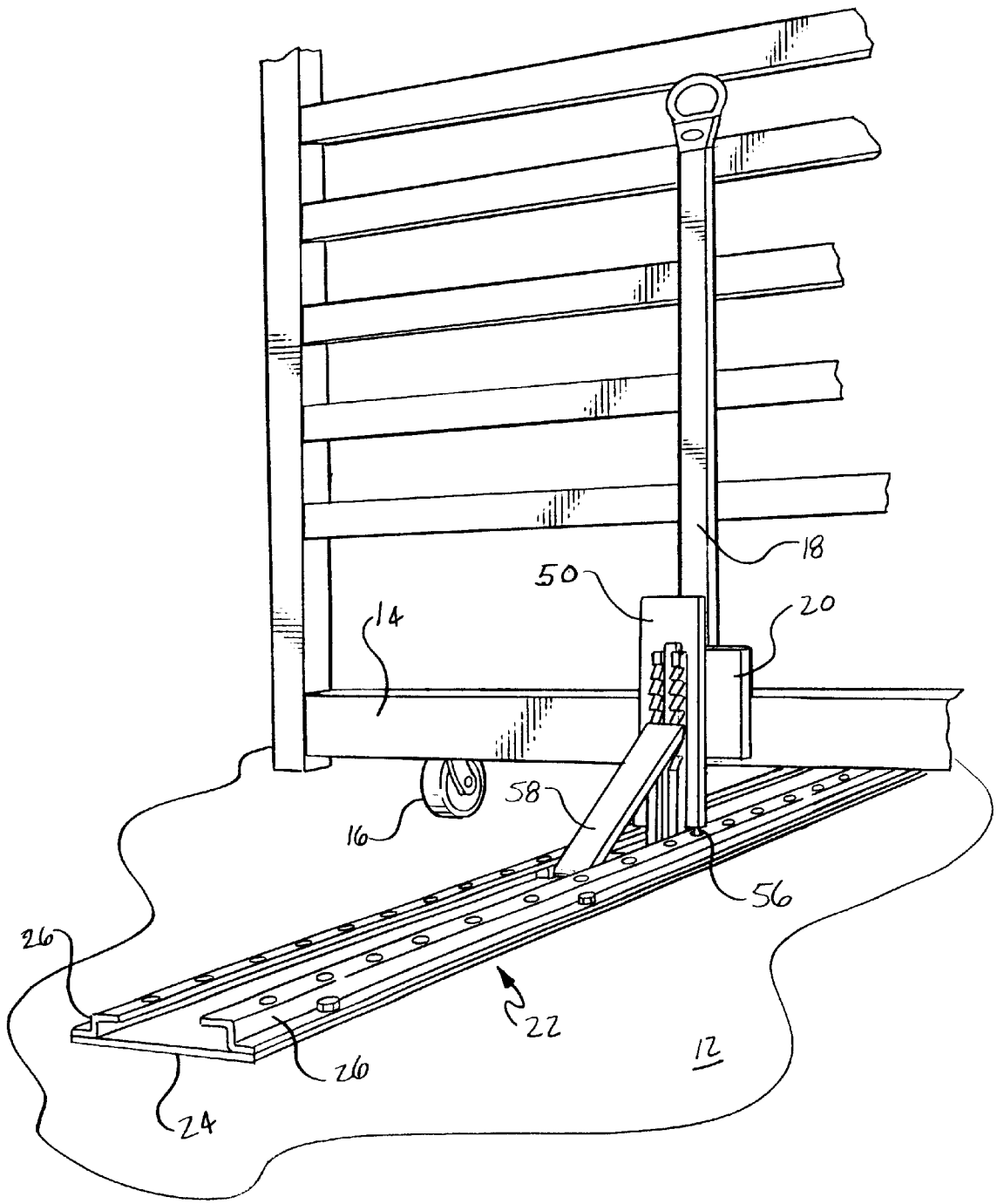
FIG. 1 is a perspective partial elevational view showing the cart lock of the invention as engaging a wheeled cart.
Figure 7:
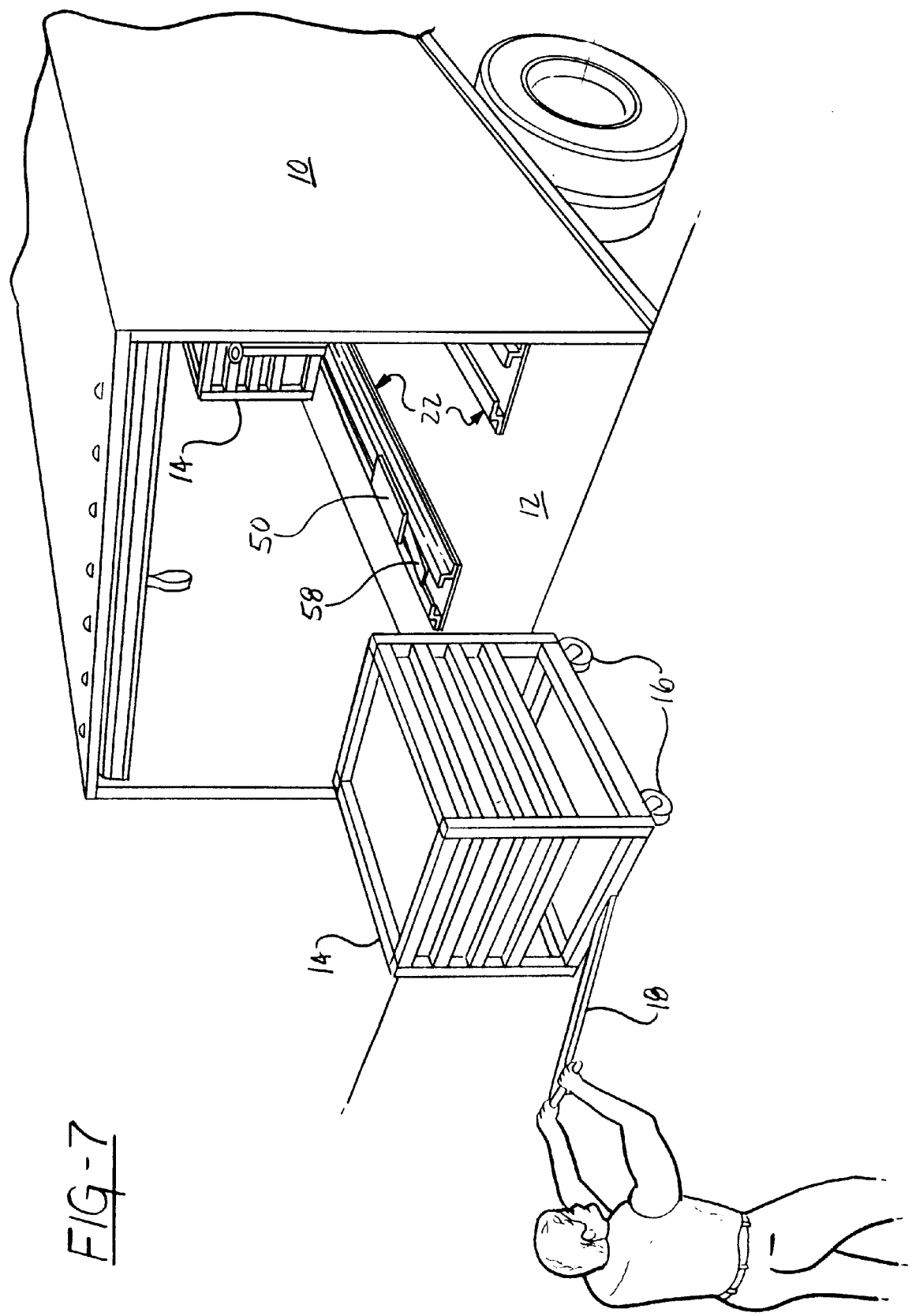
FIG. 7 is an elevational perspective view illustrating the loading of a vehicle cargo area with wheeled carts, the cart lock being illustrated in the storage position.

The cart lock in accord with the invention is used to restrain loads within moving vehicles, such as trucks, vans, railroad cars, and the like. In FIG. 7, a typical van cargo area is shown at 10 which includes a supporting floor 12. The van 10 is used to convey carts 14 upon which parts, bins, and the like, constitute the load. The carts 14 are mounted upon wheels 16, two of which may be of the caster type, and the cart is manually moved by a handle 18 pivotally mounted to the cart lower region. A handle plate 20, FIG. 1, may be mounted upon the lower region of the handle 18 for engagement with the cart lock, as later described.

The cart lock is associated with a track 22 mounted to the cargo floor 12, and in FIGS. 1–9, the track 22 is of the surface mounted type extending above the floor 12. The track assembly includes a base plate 24, FIG. 9, to which a pair of spaced parallel rails 26 are mounted by bolts 28 extending through the lower portion of the rails 26, through the base plate 24 and into the floor 12. At their upper regions, the rails 26 include inwardly extending flat flanges 30, each having a plurality of holes 32 defined therein. The holes 32 of the two flanges are equally spaced and transversely aligned. A track well 34 is defined intermediate the rails 26, the minimum dimension of the well 34 being defined by the innermost edges of the rails, and the maximum width dimension of the well being defined by the rail vertical portions 35.

The cart lock structure includes an elongated frame 36, FIG. 8, which is of a width slightly less than the well dimension defined by the rail portions 35, but greater than the dimension separating the opposed edges of rails 26, as will appreciated from FIG. 9. The frame 36 is slidably positionable throughout the length of the well 34 on the base plate 24.

At its rear end, the frame 36 includes a notch 38 intersecting the frame end, and centrally, a rectangular opening 40 is defined in the frame. Notch openings 42 are formed in the frame intersecting the frame edges adjacent the frame forward edge, and a pivot pin 44 extends through holes defined in the frame intersecting the opening 40 as will be appreciated from FIG. 8. The pivot pin 44 pivotally supports a rack plate 46 having a plurality of ratchet-like teeth 48 defined thereon. The rack plate 46 is of a width less than the width of the frame opening 40 and is capable of pivoting into the opening 40 in the storage position of the cart lock.

An abutment plate 50 is affixed to the rack plate 46 by a pair of screws 52 located within slots, FIG. 2, whereby the vertical positioning of the plate 50 may be adjusted. The lower end 54 of the abutment plate constitutes a stop edge, as later described, and a pair of cylindrical projections 56 extend from the abutment plate lower end 54 and are of a dimension slightly less than the track holes 32. The spacing between the projections 56 is identical to the spacing between aligned track holes 32, as will be appreciated from FIG. 4.

The abutment plate and rack plate assembly is maintained in its operative position by a prop lock bar 58, FIG. 8, which includes holes 60 at one end which receive the pivot pin 62 extending through the frame notch 38. The bar 58 is of a width slightly less than the width of the notch 38, and the opposite end of the lock bar 58 is formed with an oblique surface 64 to define a somewhat sharpened edge for permitting full engagement with rack plate teeth 48. A bolt 66 is threaded into the bar 58 intermediate its ends to serve as a leg for supporting the lock bar when in the storage position, FIG. 6.

In use, the cart lock components will be initially in the storage position shown in FIGS. 6 and 7 during loading or unloading of the carts 14 relative to the van 10 cargo space. In the storage position, the prop lock bar 58 will be pivoted about the pivot pin 62 so that the bar 58 will lie within the track well 34 intermediate the flanges 30. The bar 58 will rest upon the leg bolt 66 which will keep the free end of the bar from engaging the track base plate 24 and facilitate putting one's fingers under the bar end 64 to pivot the bar to the operative position. Of course, the leg bolt 66 will be adjusted so that the free end of the bar will remain within the confines of the well 34, or possibly projecting slightly above the track flanges 30.

In the storage position, the rack plate 46 will be pivoted about the pivot pin 44 such that the rack plate will lie within the frame opening 40, FIG. 6. In this storage position, the abutment plate 50 will be engaging and resting upon the track flanges 30 in view of the fact that the width of the abutment plate 50 is substantially equal to the separation of the track vertical portions 35, FIG. 9. As will be appreciated from FIGS. 6 and 7, in the storage position, the abutment plate 50 will be resting in a horizontal position only extending above the track rails 26 by a dimension equal to the thickness of the abutment plate 50.

Several carts 14 may be placed within the cargo space of the van 10, and the carts 14 closest to the front of the van cargo space will be abutting the cargo space forward wall, not shown, preventing further forward movement of the carts. After the carts 14 are properly located on the floor 12 within the van 10, straddling a track assembly 22, the frame 36 will be positioned by the operator within the track well 34 to a position wherein the pivoting of the abutment plate 50 on the rack plate 46 to an upright position causes the abutment plate to engage a cart 14, preferably the handle 18 or the handle plate 20, as apparent in FIGS. 1 and 2. When the frame 36 is properly located within the well 34, the abutment plate 50 will be engaging the cart handle 18 or handle plate 20, and the prop lock bar 58 is pivoted in a clockwise direction, FIGS. 2 and 6, so that the bar oblique end 64 will engage a pair of the teeth 48 of the rack plate 46. The weight of the lock bar 58 maintains the lock bar in firm engagement with the teeth 48 of the rack plate 46, and prevents the abutment plate 50 from pivoting about pin 44 in a counterclockwise direction, FIG. 2. In this manner, the engaged cart 14 is prevented from moving to the left, FIG. 2, and the carts 14 restrained by the lock cart will not move as the vehicle accelerates, or brakes.

Occasionally, the carts 14 have not been moved forwardly in the van 10 as far as possible, or may slightly shift during transit. In such instance, the rack plate 46 may pivot slightly in a clockwise direction, FIG. 2, to take up such "play", and if sufficient play occurs as to disengage the lock bar end 64 from the initially engaged teeth 48, the lock bar end will drop to the next set of teeth under gravitational forces automatically compensating for the movement of the abutment plate. In this manner, the cart lock automatically adjusts for cart movement to a limited degree.

Excessive clockwise pivoting of the abutment plate 50 is prevented by engagement of the plate lower end 54 with the track flanges 30, and in effect, the lower end 54 constitutes a stop limiting pivoting of the abutment plate toward the cart 14. The extent of such pivoting is controlled by the vertical position of the abutment plate on the rack plate 46 as determined by the screws 52.

Locking of the frame 36 to the track 22 is achieved by the projections 56 which extend through the flange holes 32 when the rack plate 46 and abutment plate 50 are pivoted to the upright position. Because the projections 56 are radially offset from the pivot pin 44, the projections 56 will be received within a pair of flange holes 32 as the abutment plate 50 is pivoted to the upright position for engagement with the cart 14. The projections 56 are of sufficient length as to extend through the flange holes 32 and into the frame notch openings 42, FIGS. 2 and 4. In this manner, the projections 56 are in a shear relationship to the track flanges, and all of the structure mounted upon the frame 36 is prevented from longitudinal movement with respect to the track.

When the cart lock components are moved from the operative position of FIG. 2 to the storage position of FIG. 6, the lock bar 58 will be rotated counterclockwise, FIG. 2, after the abutment plate is pushed a small degree in the clockwise direction to release the bar 58 from the teeth 48, and then the rack plate and abutment plate assembly is pivoted in a counterclockwise direction which withdraws the projections 56 from the flange holes 32 permitting the frame 36 to be positioned as desired within the track well 34.

The inventive concepts may also be utilized in a recessed track arrangement wherein the track components are built into the floor of the van 10, or other cargo area, rather than the track being surfaced mounted as shown in FIGS. 1–9.

With reference to FIG. 10, a recessed track construction is illustrated wherein the track 68 is mounted within an elongated groove 69 located in the van floor 12'. The track 68 includes a base 70 and vertically extending legs 72 which terminate in inwardly extending flanges 74 having holes 76 defined therein. The cart lock structure of the invention as used with the track 68 is identical to the previously described operation. In the use of a recessed track 68, the vertical dimension of the cart lock structure within the cargo space is less than with a surface mounted track, and only the abutment plate 50 will extend above the level of the floor 12'.

It is appreciated that various modifications to the inventive concepts may be apparent to those skilled in the art without departing from the spirit and scope of the invention.

What is claimed is:

1. A cargo lock for preventing cargo supported on a floor from shifting comprising, in combination, an elongated track affixed to the floor having a pair of spaced parallel rails defining an elongated linear well therebetween, spaced detents defined in said tracks, an elongated frame slidably located within said well between said rails having first and second ends, an abutment plate assembly having a pivot and pivotally mounted on said frame at said first end having front and back sides and pivotal between an upright operative position and a substantially horizontal inoperative position, a prop lock bar pivotally mounted on said frame second end pivotal between a prop position operatively engaging said abutment plate assembly when in said operative upright position and a storage position, a prop shoulder defined on said abutment plate assembly back side engageable with said lock bar when said lock bar is in said prop position, and locking means defined on said abutment plate assembly engageable with said track detents when said abutment plate assembly is in said operative upright position locking said frame against movement relative to said track rails and disengaging from said track detents when said abutment plate assembly is in said inoperative position.

2. In a cargo lock as in claim 1, wherein said detents defined in said tracks comprise holes and said locking means comprises projections radially spaced with respect to said abutment plate assembly pivot receivable within said holes.

3. In a cargo lock as in claim 2, shear openings defined in said frame first end closely receiving said projections when said abutment plate assembly is in said upright operative position wherein said projections are located between said abutment plate assembly and said frame and placed in shear with respect to said tracks.

4. In a cargo lock as in claim 1, a plurality of spaced rack teeth defined on said abutment plate assembly's back side, said teeth defining said prop shoulder and permitting adjustment of the operative position of said abutment plate.

5. In a cargo lock as in claim 1, said prop lock bar being of a width less than the spacing between said tracks whereby said lock bar is received within said track well when in said storage position.

6. In a cargo lock as in claim 5, an adjustable leg defined on said prop lock bar supporting said lock bar relative to the floor when said lock bar is in said storage position within said track well.

7. In a cargo lock as in claim 3 wherein said shear openings defined in said frame comprise notches.

8. In a cargo lock as in claim 4, said abutment plate assembly including a rack plate affixed to an abutment plate having a back side, said rack teeth being defined on said rack plate, said rack plate being pivotally mounted to said frame constituting means for pivotally mounting said abutment plate assembly to said frame.

9. In a cargo lock as in claim 8, said rack plate being of a width less than the spacing between said tracks whereby said rack plate is received within said track well when said abutment plate assembly is pivoted to said inoperative position.

10. In a cargo lock as in claim 9, stop means defined on said abutment plate preventing pivoting of said abutment plate assembly substantially beyond a vertical upright position when pivoting away from said prop lock bar.

* * * * *